US012718701B2

(12) United States Patent
Tanabiki et al.

(10) Patent No.: US 12,718,701 B2
(45) Date of Patent: Aug. 25, 2026

(54) UNMANNED AERIAL VEHICLE INFORMATION ACQUISITION SYSTEM AND UNMANNED AERIAL VEHICLE INFORMATION ACQUISITION METHOD

(71) Applicant: NEC Corporation, Tokyo (JP)

(72) Inventors: Tetsuya Tanabiki, Tokyo (JP); Takuya Hisamoto, Tokyo (JP); Kenichi Kijima, Tokyo (JP); Eiichi Tokumi, Tokyo (JP); Takahiro Mizuta, Tokyo (JP); Takuya Nomura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 93 days.

(21) Appl. No.: 18/838,680

(22) PCT Filed: Mar. 17, 2022

(86) PCT No.: PCT/JP2022/012106
§ 371 (c)(1),
(2) Date: Aug. 15, 2024

(87) PCT Pub. No.: WO2023/175810
PCT Pub. Date: Sep. 21, 2023

(65) Prior Publication Data
US 2025/0174138 A1 May 29, 2025

(51) Int. Cl.
*G08G 5/02* (2006.01)
*G08G 5/57* (2025.01)
*B64C 39/02* (2023.01)

(52) U.S. Cl.
CPC .................................... *G08G 5/57* (2025.01)

(58) Field of Classification Search
CPC .. G08G 5/02; G08G 5/34; G08G 5/36; G05D 1/00; G05D 1/12; B64C 39/02
See application file for complete search history.

(56) References Cited

U.S. PATENT DOCUMENTS 9,802,701 B1 * 10/2017 Hawes ................. G01C 21/005
2014/0156109 A1 * 6/2014 Estkowski ............. G05D 1/106
701/2

(Continued)

FOREIGN PATENT DOCUMENTS

JP 2018-136205 A 8/2018
JP 2018-165931 A 10/2018

(Continued)

OTHER PUBLICATIONS

International Search Report for PCT Application No. PCT/JP2022/012106, mailed on May 31, 2022.

(Continued)

*Primary Examiner* — Tan Q Nguyen

(57) ABSTRACT

The present invention arranges a plurality of receivers, which receive identification information from an unmanned aerial vehicle via wireless communication, at different locations in order to increase the probability of acquiring the identification information transmitted from the unmanned aerial vehicle. The identification information is information that includes vehicle-specific information assigned to the unmanned aerial vehicle, positional information representing the position of the unmanned aerial vehicle, and time information. Each of the receivers is connected to an information processing device that acquires the identification information received by the receivers and processes the identification information. At least one of the receivers connected to the information processing device is mounted on a moving body.

11 Claims, 7 Drawing Sheets

(56) References Cited

U.S. PATENT DOCUMENTS

| | | | | |
|---|---|---|---|---|
| 2018/0239368 | A1* | 8/2018 | Nishita | G08G 5/30 |
| 2020/0410874 | A1* | 12/2020 | Jensen | G08G 5/727 |
| 2023/0095120 | A1* | 3/2023 | Choi | G08G 5/727<br>340/5.61 |
| 2023/0237918 | A1* | 7/2023 | Gong | H04W 12/122<br>701/120 |

FOREIGN PATENT DOCUMENTS

| | | | | |
|---|---|---|---|---|
| JP | 2021-086168 | A | 6/2021 | |
| JP | 2021-135942 | A | 9/2021 | |
| JP | 2021-190951 | A | 12/2021 | |
| JP | 2021190951 | * | 12/2021 | H04W 16/26 |
| WO | 2019/159420 | A1 | 8/2019 | |
| WO | 2020/162583 | A1 | 8/2020 | |
| WO | 2021/070253 | A1 | 4/2021 | |

OTHER PUBLICATIONS

English translation of Written opinion for PCT Application No. PCT/JP2022/012106, mailed on May 31, 2022.

JP Office Action for JP Application No. 2024-507330, mailed on Dec. 2, 2025 with English Translation.

* cited by examiner

UNMANNED AERIAL VEHICLE INFORMATION ACQUISITION SYSTEM AND UNMANNED AERIAL VEHICLE INFORMATION ACQUISITION METHOD

This application is a National Stage Entry of PCT/JP2022/012106 filed on Mar. 17, 2022, the contents of all of which are incorporated herein by reference, in their entirety.

TECHNICAL FIELD

The present invention relates to a technique for acquiring a flight position of an unmanned aerial vehicle.

BACKGROUND ART

In logistics, infrastructure inspection, and the like, the use of unmanned aerial vehicles has become full-scale. The unmanned aerial vehicle herein is an airplane, a rotorcraft, a glider, an airship, or the like that can be used for aviation, and can be flown by remote operation or automatic operation. Such an unmanned aerial vehicle is also referred to as a drone, an unmanned aerial vehicle (UAV), or the like.

Efforts have been made by the country to achieve such beyond-visual flight of the unmanned aerial vehicle, and as one of them, airframe registration for the unmanned aerial vehicle is mandated from June 2022. Based on the rules associated with this, information called remote identification (ID) is transmitted from the flying unmanned aerial vehicle by wireless communication. The remote ID includes airframe specific information (airframe registration number), position information, and time information.

PTL 1 (WO 2019/159420 A1) shows a database (flight management device) connected to a plurality of check points via a wireless communication network. This database acquires the position of the mobile object (drone) via the check point, and instructs or changes the movement path to the mobile object as necessary.

CITATION LIST

Patent Literature

PTL 1: WO 2019/159420 A1

SUMMARY OF INVENTION

Technical Problem

It is considered to manage the flight of the unmanned aerial vehicle using the remote ID transmitted from the unmanned aerial vehicle. That is, since the remote ID includes the position information, the flight position of the unmanned aerial vehicle to be managed can be acquired using the remote ID. Using the acquired flight position, it is checked whether the unmanned aerial vehicle to be managed is flying according to a predetermined flight plan, and the flight is managed. In order to achieve the flight management of the unmanned aerial vehicle using such a remote ID, a receiver (hereinafter, also referred to as an RID receiver) that receives the remote ID is installed on the ground side.

Since the remote ID is transmitted from the unmanned aerial vehicle by wireless communication, the remote ID may not be successfully received by the RID receiver depending on the wireless communication status of the airspace in which the unmanned aerial vehicle is flying. In such a case, there is a problem that the flight management of the unmanned aerial vehicle may be disturbed due to the fact that the remote ID cannot be received.

The present invention has been devised in order to solve the above problems. That is, a main object of the present invention is to provide a technique for increasing a probability that a remote ID that is identification information transmitted from an unmanned aerial vehicle can be acquired.

Solution to Problem

In order to achieve the above object, an unmanned aerial vehicle information acquisition system according an aspect of to the present invention includes a plurality of receivers that receive identification information from an unmanned aerial vehicle by wireless communication, the identification information including airframe specific information assigned to the unmanned aerial vehicle, position information indicating a position of the unmanned aerial vehicle, and time information, and that are disposed at different places, and an information processing device that is connected to the plurality of receivers, that acquires the identification information received by the plurality of receivers, and that processes the identification information, wherein at least one of the plurality of receivers connected to the information processing device is mounted on a mobile object.

An unmanned aerial vehicle information acquisition method according an aspect of to the present invention includes disposing a plurality of receivers that receive identification information from an unmanned aerial vehicle by wireless communication, the identification information including airframe specific information assigned to the unmanned aerial vehicle, position information indicating a position of the unmanned aerial vehicle, and time information, at different places, and connecting each of the plurality of receivers and an information processing device that acquires the identification information received by the plurality of receivers and processes the identification information, wherein at least one of the plurality of receivers connected to the information processing device is mounted on a mobile object.

Advantageous Effects of Invention

According to the present invention, it is possible to increase a probability that identification information transmitted from an unmanned aerial vehicle can be acquired.

EXAMPLE EMBODIMENT

Hereinafter, an example embodiment according to the present invention will be described with reference to the drawings.

First Example Embodiment

Figure 1:
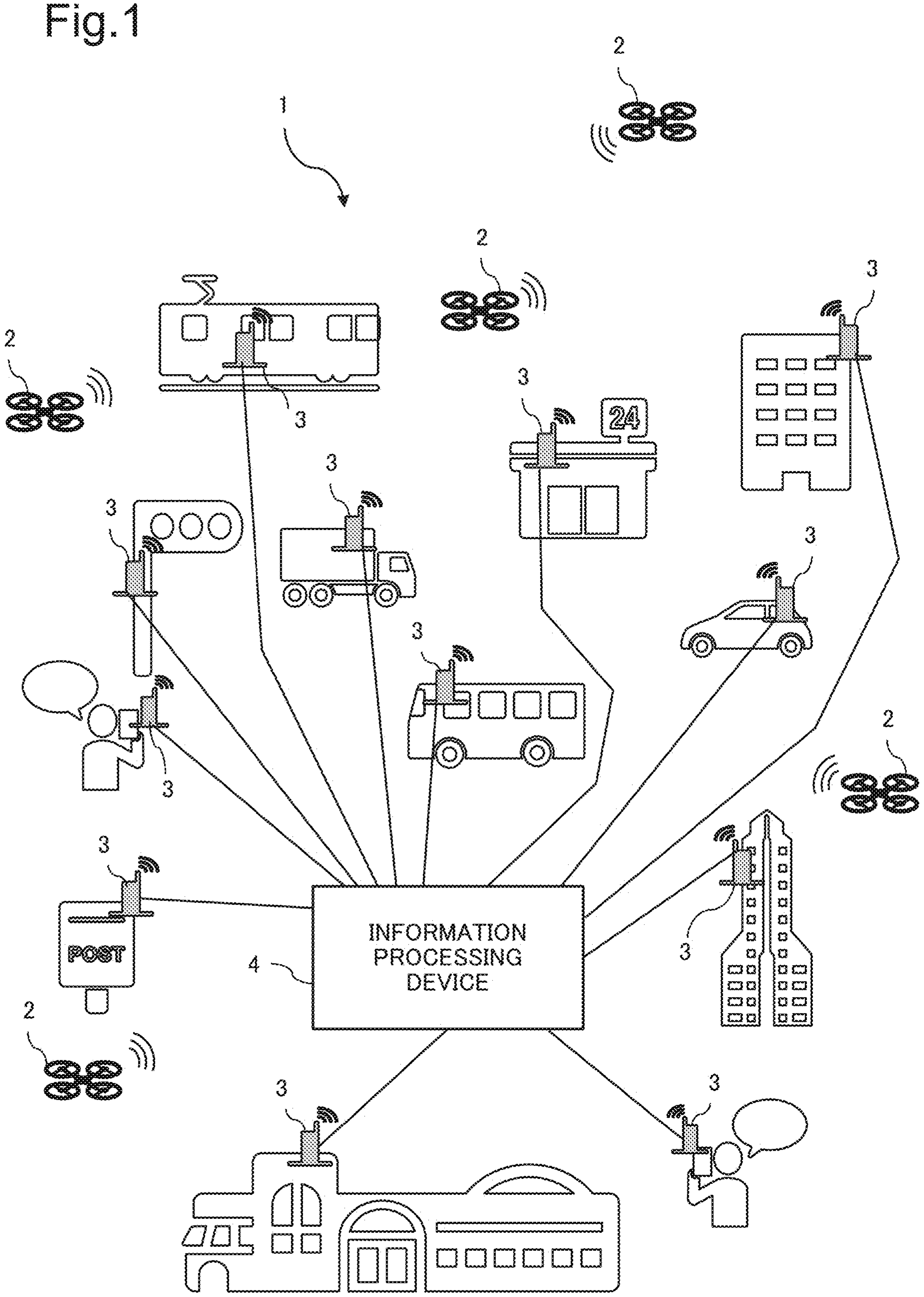
FIG. 1 is an image view illustrating a configuration of an unmanned aerial vehicle information acquisition system according to the first example embodiment of the present invention.

FIG. 1 is an image diagram illustrating a configuration of an unmanned aerial vehicle information acquisition system according to the first example embodiment of the present invention. An unmanned aerial vehicle information acquisition system 1 of the first example embodiment is a system that acquires a remote ID that is identification information transmitted by an unmanned aerial vehicle 2. The unmanned aerial vehicle 2 can be used for aviation and can be flown by remote operation or automatic operation, and includes a so-called drone or a flying car. The remote ID is identification information transmitted from the unmanned aerial vehicle 2 in flight by wireless communication, and includes airframe specific information, position information, and time information. The airframe specific information is information including an airframe specific number assigned to each unmanned aerial vehicle 2, and a registration number issued (assigned) by registering an airframe in the country is included as the airframe specific number. The position information is, for example, information indicating a flight position of the unmanned aerial vehicle 2 acquired using a global navigation satellite system (GNSS) such as a global positioning system (GPS). The position information included in the remote ID to be transmitted is information indicating a position that can be regarded as the flight position of the unmanned aerial vehicle 2 at the time of transmitting the remote ID. The time information is information indicating the time at which the information indicating the flight position in the position information has been acquired. Such airframe specific information, position information, and time information are associated with each other, and the remote ID including the airframe specific information, the position information, and the time information is transmitted from the unmanned aerial vehicle 2 by wireless communication at predetermined timings (for example, every one second). Bluetooth (registered trademark) is used as the wireless communication method of the remote ID, for example.

An unmanned aerial vehicle information acquisition system (hereinafter, it is also simply referred to as an information acquisition system) 1 according to the first example embodiment includes a plurality of receivers (RID receivers) 3 and an information processing device 4 connected to each of the RID receivers 3 via an information communication network. The RID receiver 3 has a function of receiving a remote ID transmitted from the unmanned aerial vehicle 2 and a function of transmitting the received remote ID to the information processing device 4. As long as the RID receiver 3 has a configuration capable of receiving a remote ID and capable of being connected to the information processing device 4 via an information communication network, its configuration is not limited and the description thereof will be omitted here.

In the first example embodiment, in order to more reliably acquire the remote ID transmitted from the unmanned aerial vehicle 2 in flight, a large number of RID receivers 3 are disposed. That is, even when the RID receiver 3 closest to the unmanned aerial vehicle 2 cannot receive the remote ID transmitted from the unmanned aerial vehicle 2, the information acquisition system 1 (information processing device 4) can acquire the remote ID of the unmanned aerial vehicle 2 as long as the nearby RID receiver 3 can receive the remote ID. In consideration of such a situation, in the first example embodiment, a large number of RID receivers 3 are installed in consideration of the set route of the unmanned aerial vehicle 2 and in such a manner that a plurality of RID receivers 3 is disposed within an assumed radio wave coverage of the remote ID (radio wave) transmitted from the unmanned aerial vehicle 2. Accordingly, when any one of the plurality of RID receivers 3 within the radio wave coverage can receive the remote ID transmitted from the unmanned aerial vehicle 2, the information acquisition system 1 (information processing device 4) can increase the acquisition rate of the remote ID. In a case where the RID receiver 3 is fixed to a building, a pole of a traffic signal, or the like, the installation location is set in consideration of ease of installation, the surrounding environment of the installation location (density of buildings, height of a surrounding building, and the like), and the like.

In the first example embodiment, the RID receiver 3 is not only fixedly installed on a building, a pole of a traffic signal, a utility pole, a post, and the like as illustrated in FIG. 1, but also mounted on a mobile object. Specific examples of the mobile object equipped with the RID receiver 3 include a vehicle (a truck, a route bus, a private car, or the like), a portable terminal, and the like. The RID receiver 3 mounted on the vehicle is, for example, in the form of a separate and independent device (module), and is installed at an appropriate place in the vehicle. Examples of the portable terminal equipped with the RID receiver 3 include a smartphone, a tablet terminal, and an in-vehicle terminal for car navigation. The RID receiver 3 included in such a portable terminal is implemented by, for example, a communication function included in the portable terminal and a central processing unit (CPU) that executes an application program (application) for communicating a remote ID. Alternatively, a device functioning as the RID receiver 3 may be built in the portable terminal.

As described above, since some of the RID receivers 3 are equipped in the mobile objects, these RID receivers 3 move, and thus, it is possible to increase the probability that the remote ID can be received in the information acquisition system 1 (the information processing device 4) as compared with the case where all the positions of the RID receivers 3 are fixed. That is, in consideration of the communication method of the remote ID, the communication status of the radio wave may be improved only by a slight change in the position of the RID receiver 3 with respect to the unmanned aerial vehicle 2. For this reason, the RID receiver 3 that has not been able to receive the remote ID is provided in the mobile object, and the remote ID can be received by the improvement of the radio wave communication status due to the movement of the RID receiver 3 accompanying the movement of the mobile object. That is, equipping the mobile objects with some of the RID receivers 3 is considered to contribute to improvement of the remote ID acquisition rate in the information acquisition system 1 (the information processing device 4). When some of the RID receivers 3 are mounted on the mobile objects, an effect of enabling acquisition of a remote ID in a place where it is difficult to fix the RID receiver 3 is also obtained.

Figure 2:
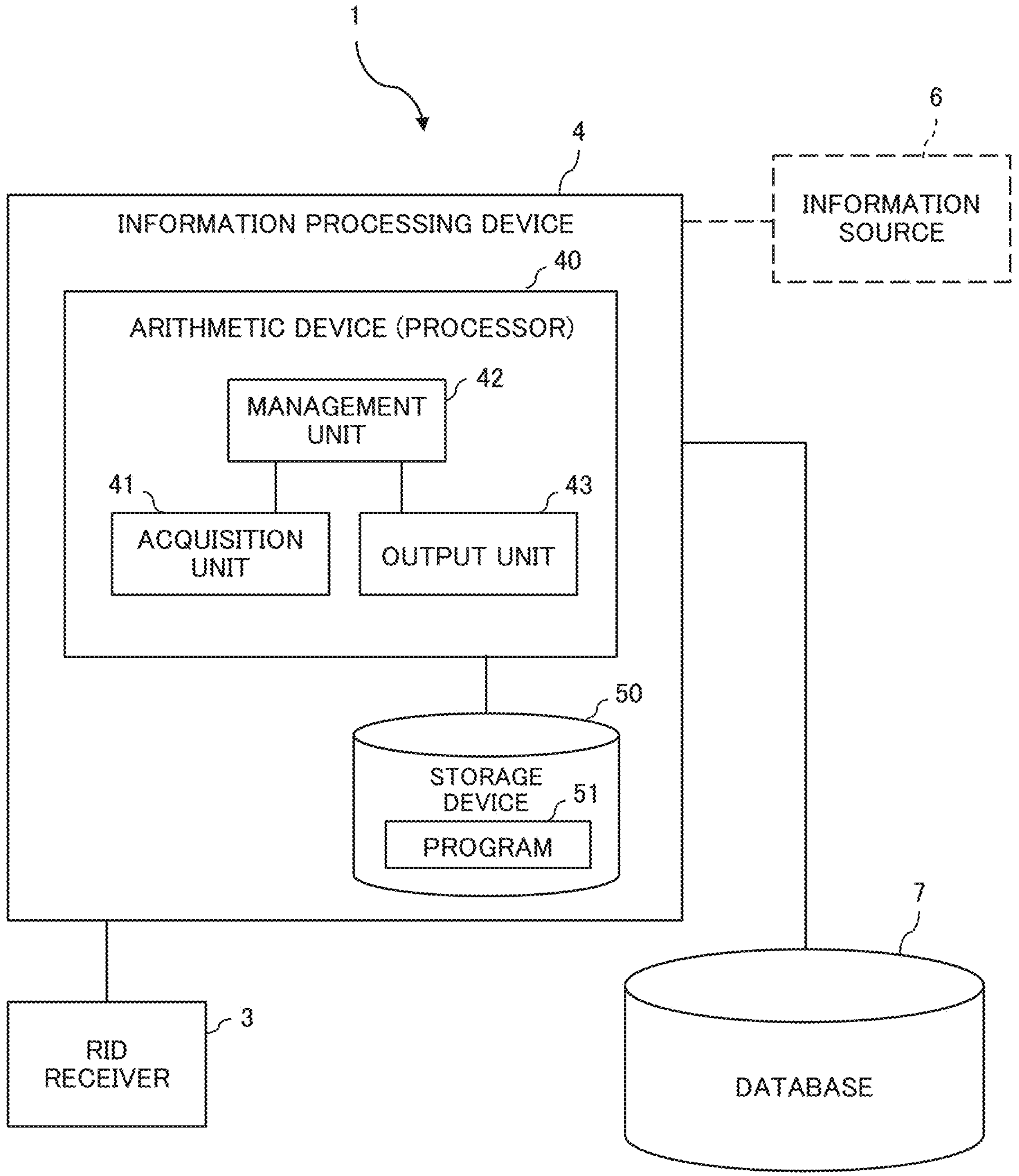
FIG. 2 is a diagram illustrating a configuration example of an information processing device including a management unit.

The information processing device 4 is a computer device, acquires a remote ID from the unmanned aerial vehicle 2 via the RID receiver 3, and executes predetermined processing using the remote ID. An example of processing by the information processing device 4 using the remote ID includes flight management of the unmanned aerial vehicle 2. FIG. 2 is a diagram illustrating a configuration of the information processing device 4 having a function as a flight management device. In this example, the information processing device 4 includes an arithmetic device 40 and a storage device 50. The storage device 50 includes a storage medium that stores data and a computer program (hereinafter, also referred to as a program) 51. There is a plurality of types of storage devices such as a magnetic disk device and a semiconductor memory element, and there is a plurality of types of semiconductor memory elements such as a random access memory (RAM) and a read only memory (ROM). The number of the types of the storage device 50 included in the information processing device 4 is not limited to one. A computer device is often provided with a plurality of types of storage devices. The type and the number of storage devices 50 included in the information processing device 4 are not limited, and the description thereof will be omitted. In a case where the information processing device 4 includes a plurality of types of storage devices 50, they are collectively referred to as a storage device 50.

The storage device 50 stores a computer program for causing the information processing device 4 to have a function of performing flight management of the unmanned aerial vehicle 2.

The arithmetic device 40 includes a processor such as a central processing unit (CPU) or a graphics processing unit (GPU). The arithmetic device 40 can have various functions based on the program 51 by reading and executing the program 51 stored in the storage device 50. The arithmetic device 40 includes an acquisition unit 41, a management unit 42, and an output unit 43 as functional units related to flight management of the unmanned aerial vehicle 2.

The acquisition unit 41 has a function of acquiring the remote ID received by the RID receiver 3 from a large number of RID receivers 3 as described above. The information included in the received remote ID is associated with each other, and is held in the storage device 50 in a state in which, for example, receiver identification information for identifying the RID receiver 3 that has transmitted the information is further associated.

The management unit 42 executes a process of performing flight management of the unmanned aerial vehicle 2 to be managed using the airframe specific information, the position information, and the time information included in the remote ID acquired by the acquisition unit 41. The output unit 43 outputs a result of processing by the management unit 42 from the arithmetic device 40 to a preset output destination.

The processing executed by the management unit 42 includes various types of processing. An example of processing related to the flight management will be described.

For example, information about the flight plan of the unmanned aerial vehicle 2 to be managed is stored in advance in a database 7 to which the storage device 50 or the information processing device 4 is connected. For example, airframe specific information of the unmanned aerial vehicle 2 that executes the flight plan is associated with the information of the flight plan. Instead of the airframe specific information (that is, the registration number assigned by the country), an airframe differentiation number, unique to the system, assigned to the unmanned aerial vehicle 2 by the information acquisition system 1 to identify the unmanned aerial vehicle 2 may be associated with the flight plan. In such a case, for example, data indicating a correspondence relationship between the airframe differentiation number and the airframe specific information (registration number) is held in the storage device 50.

Using the airframe specific information of the remote ID acquired by the acquisition unit 41, the management unit 42 refers to the flight plan of the unmanned aerial vehicle 2 related to the airframe specific information in the storage device 50 or the database 7. The management unit 42 compares the position information and the time information included in the remote ID with the flight route and the scheduled flight time included in the flight plan, and determines whether the unmanned aerial vehicle 2 is flying according to the flight plan. Furthermore, as a result of the determination, for example, in a case where it is detected that the aircraft is flying outside the allowable range from the planned flight route (hereinafter, also referred to as a planned route), the management unit 42 executes a predetermined handling process. As the handling process, for example, in a case where the management unit 42 (information processing device 4) can directly control the unmanned aerial vehicle 2, the management unit 42 executes the flight control of the unmanned aerial vehicle 2 deviating from the planned route in order to correct the flight route. In this case, the output unit 43 outputs a control signal toward the unmanned aerial vehicle 2 to be flight-controlled.

The information processing device 4 performs flight management of the unmanned aerial vehicle 2 to be managed, and flight control (operation) of the unmanned aerial vehicle 2 may be executed by a control system (ground control station (GCS)) different from the information processing device 4. In this case, the management unit 42 may notify the control system controlling the unmanned aerial vehicle 2 deviating from the planned route of information indicating deviation from the planned route by the output unit 43. In such a case, data in which the unmanned aerial vehicle 2 to be managed and information (including information about a contact address) representing a control system for controlling the unmanned aerial vehicle 2 are associated with each other is held in the storage device 50 or the database 7.

Further, the management unit 42 detects the unmanned aerial vehicle 2 flying within a notification range determined based on the flight position of the unmanned aerial vehicle 2 deviated from the planned route using the position information included in the remote ID acquired by the acquisition unit 41. The management unit 42 may notify the control system performing the flight control of the detected unmanned aerial vehicle 2 of information indicating that the unmanned aerial vehicle 2 deviating from the planned route is flying nearby by the output unit 43. Incidentally, it is assumed that there is a case where the remote ID transmitted from the unmanned aerial vehicle 2 other than the unmanned aerial vehicle to be managed is included in the large number of remote IDs acquired by the acquisition unit 41 from the RID receiver 3. For example, it is assumed that the information processing device 4 can access a database of a system related to registration of an unmanned aerial vehicle such as a drone information infrastructure system (Drone/UAS Information Platform System (DIPS)) and acquire information about a pilot or the like of the unmanned aerial vehicle. In this case, the management unit 42 can acquire information about a contact address of the pilot (GCS) associated with the remote ID transmitted from the unmanned aerial vehicle 2 other than the unmanned aerial vehicle to be managed. As a result, the management unit 42 may also notify a pilot (GCS) performing flight control of the unmanned aerial vehicle 2 other than the unmanned aerial vehicle to be managed of information indicating that the unmanned aerial vehicle 2 deviating from the planned route is flying nearby.

The handling process in a case where the unmanned aerial vehicle 2 to be managed deviates from the planned route includes various types of processing including the above-described example, and the handling process executed by the management unit 42 is not limited. The tracking processing of the unmanned aerial vehicle 2 to be managed may be executed using the position information and the time information included in the remote ID, and the management unit 42 may execute the flight management of the unmanned aerial vehicle 2 as described above using the result of the processing.

An example of another process related to flight management of the unmanned aerial vehicle 2 will be described. This example is an example of flight management (flight control) related to a manned aircraft flying in an emergency such as an emergency medical helicopter or a fire and disaster prevention helicopter. That is, in the case of making a flight plan of the unmanned aerial vehicle, for example, the flight route and the take-off and landing time are adjusted so as not to cause abnormal approach and collision between the unmanned aerial vehicles with reference to the flight plan of another unmanned aerial vehicle.

On the other hand, an emergency start of an emergency medical helicopter or a fire and disaster prevention helicopter (hereinafter, also referred to as an emergency helicopter) is a start in response to an emergency request, and a flight route and a flight time (take-off and landing time) of an emergency helicopter to be urgently dispatched are not planned in advance. Since the flight by the emergency dispatch of the emergency helicopter is prioritized over the flight of the unmanned aerial vehicle 2, it is necessary to change the flight plan of the unmanned aerial vehicle 2 in a case where the unmanned aerial vehicle 2 may obstruct the flight of the emergency helicopter.

In consideration of this, it is conceivable to perform flight management of the unmanned aerial vehicle 2. For example, the information processing device 4 is connected to an information source 6. The information source 6 is an information source that makes a notification that an emergency helicopter is dispatched. In a case where the information processing device 4 can be connected to the emergency helicopter management system that manages the flight of the emergency helicopter, the information processing device 4 is connected to the emergency helicopter management system as the information source 6. Alternatively, in a case where the information processing device 4 is not connected to the emergency helicopter management system, the information processing device 4 is connected to a detection device (for example, a device that detects dispatch of an emergency helicopter using a radar) that detects dispatch of an emergency helicopter as the information source 6.

Figure 3:
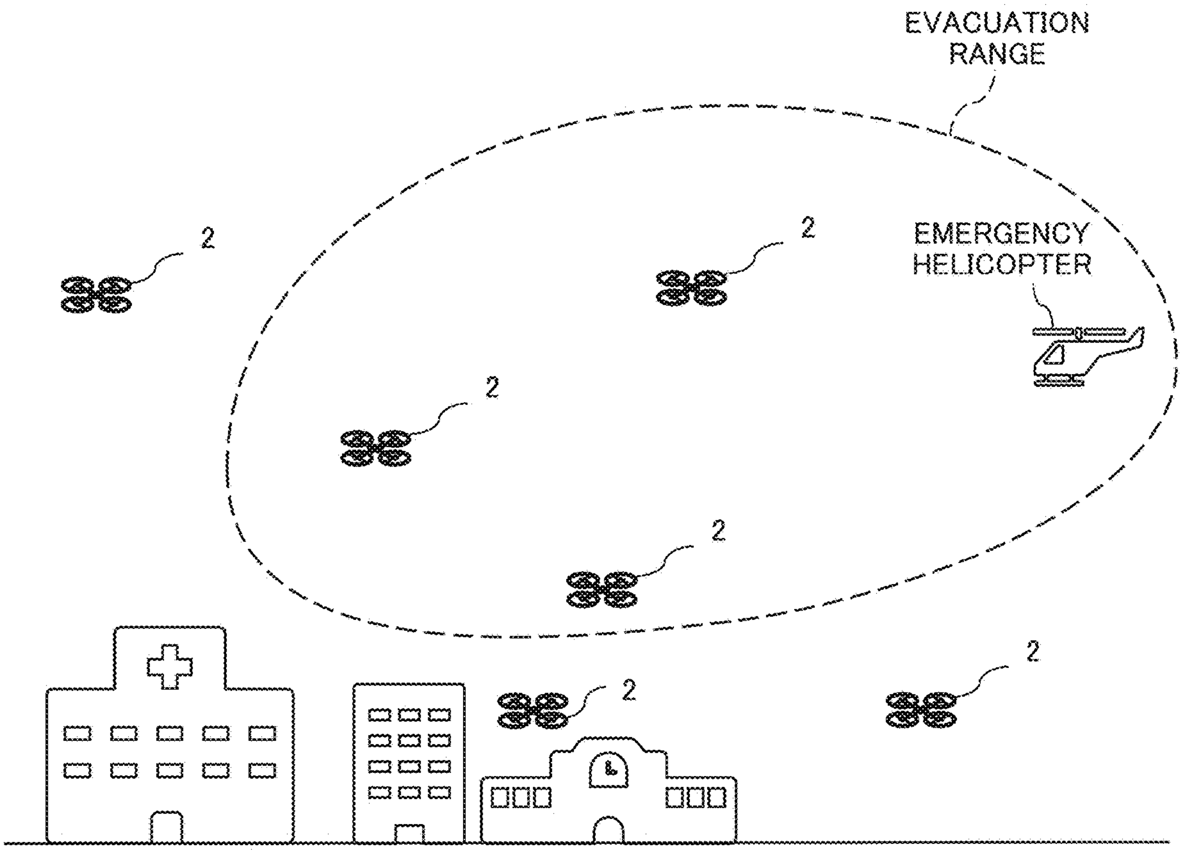
FIG. 3 is a diagram for describing an example of flight management of an unmanned aerial vehicle.

In a case of acquiring information making a notification of dispatch of an emergency helicopter from the information source 6 as described above, the management unit 42 executes the predetermined emergency helicopter handling process related to the dispatch of the emergency helicopter. For example, the management unit 42 acquires flight position information about an emergency helicopter from an emergency helicopter management system or a detection device. Further, the management unit 42 detects the unmanned aerial vehicle 2 flying within the evacuation range defined based on the position of the emergency helicopter as illustrated in FIG. 3 using the position information included in the remote ID transmitted from the unmanned aerial vehicle 2. The management unit 42 causes the unmanned aerial vehicle 2 whose flight has been detected within the evacuation range to land. That is, in a case where the flight of the unmanned aerial vehicle 2 can be directly controlled, the management unit 42 instructs the flying unmanned aerial vehicle 2 in the evacuation range to land by the output unit 43. Alternatively, in a case where a control system (GCS) different from the information processing device 4 executes control (operation) of the unmanned aerial vehicle 2, the management unit 42 may notify, by the output unit 43, the control system controlling the unmanned aerial vehicle 2 in flight within the evacuation range of an instruction to request landing. It is assumed that the information processing device 4 can access the database of the system related to the registration of the unmanned aerial vehicle as described above in a case where the unmanned aerial vehicle 2 other than the unmanned aerial vehicle to be managed is flying within the evacuation range. In such a case, the management unit 42 may notify the pilot (GCS) who is performing flight control of the unmanned aerial vehicle 2 other than the unmanned aerial vehicle to be managed within the evacuation range of the instruction of the landing request caused by the dispatch of the emergency helicopter by the output unit 43 using the information held in the database.

Furthermore, an example of another process related to flight management of the unmanned aerial vehicle 2 will be described. This example is an example of flight management (flight control) when an abnormality occurs in the unmanned aerial vehicle 2. For example, it is assumed that the unmanned aerial vehicle 2 is equipped with a sensor (hereinafter, also referred to as a state detection sensor) that detects the state of the unmanned aerial vehicle 2, and the occurrence of the abnormality of the unmanned aerial vehicle 2 can be detected by analyzing the output information of the state detection sensor. Examples of the state detection sensor include a sensor that detects an abnormality of an electric circuit mounted on the unmanned aerial vehicle 2, and an acceleration sensor that detects a shake of the unmanned aerial vehicle 2.

The abnormality detection unit that detects the abnormality of the unmanned aerial vehicle 2 by analyzing the output information of the state detection sensor is provided in, for example, a control device (computer device) mounted on the unmanned aerial vehicle 2. In this case, in a case where an abnormality occurs in the unmanned aerial vehicle 2, information making a notification that the abnormality has occurred is transmitted from the unmanned aerial vehicle 2 in association with the remote ID. Alternatively, information for making a notification of an abnormality may be transmitted from the unmanned aerial vehicle 2 in a mode included in the remote ID. The information making a notification of the abnormality is acquired by the information processing device 4 via the RID receiver 3, whereby the information processing device 4 detects the abnormality of the unmanned aerial vehicle 2.

The output information of the state detection sensor may be transmitted from the unmanned aerial vehicle 2 in a mode included in the remote ID, for example, and thus may be acquired by the information processing device 4. The information processing device 4 may analyze output information of the state detection sensor in the unmanned aerial vehicle 2 to detect an abnormality.

In a case of detecting that there is the unmanned aerial vehicle 2 to be managed in which the abnormality has occurred, the management unit 42 of the information processing device 4 instructs the unmanned aerial vehicle 2 to land by the output unit 43 in a case where the unmanned aerial vehicle 2 in which the abnormality has occurred can be directly controlled. Alternatively, in a case where a control system (GCS) different from the information processing device 4 executes control (operation) of the unmanned aerial vehicle 2, the management unit 42 may notify the control system controlling the unmanned aerial vehicle 2 in which the abnormality occurs of the landing instruction by the output unit 43.

Further, the management unit 42 detects the unmanned aerial vehicle 2 flying within a notification range determined based on the flight position of the unmanned aerial vehicle 2 in which the abnormality occurs using the position information included in the remote ID acquired by the acquisition unit 41. The management unit 42 may notify the control system performing the flight control of the detected unmanned aerial vehicle 2 of the information indicating that the unmanned aerial vehicle 2 in which the abnormality occurs is flying nearby by the output unit 43. Further, it is assumed that the information processing device 4 can access a database of a system related to registration of the unmanned aerial vehicle and can acquire information about a contact address of a pilot (GCS) associated with the remote ID transmitted from the unmanned aerial vehicle 2 other than the unmanned aerial vehicle to be managed. In this case, the management unit 42 may also notify a pilot (GCS) performing flight control of the unmanned aerial vehicle 2 other than the unmanned aerial vehicle to be managed of information indicating that the unmanned aerial vehicle 2 in which the abnormality occurs is flying nearby.

Figure 4:
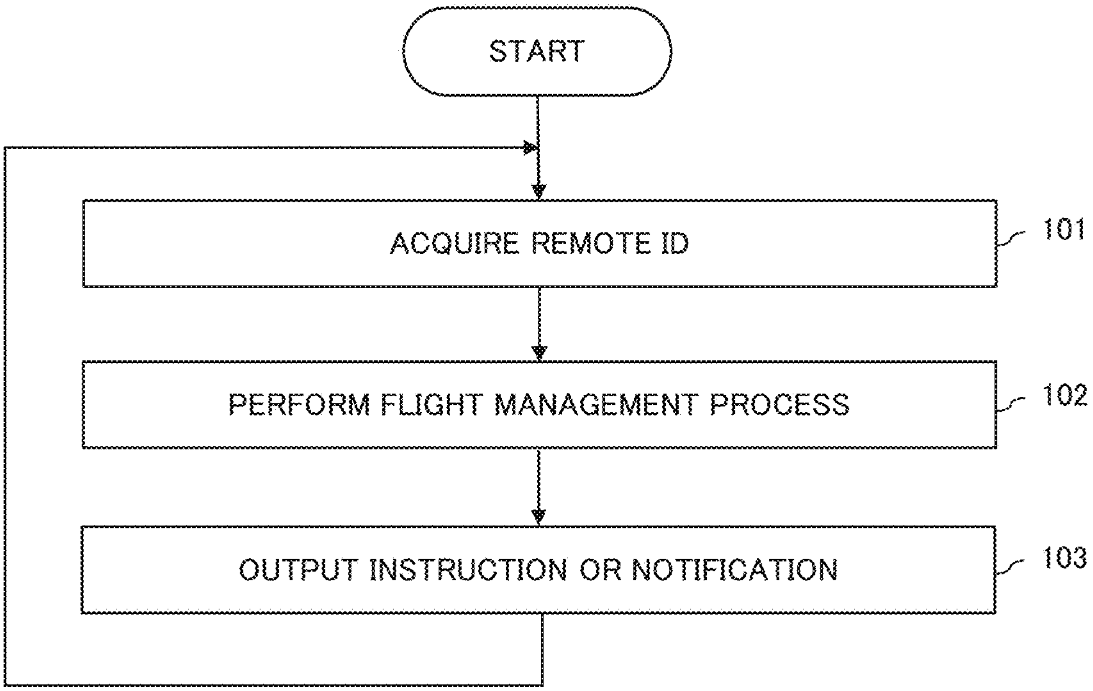
FIG. 4 is a flowchart illustrating an operation example of an information processing device including a management unit.

FIG. 4 is a flowchart illustrating an example of the operation related to the flight management of the unmanned aerial vehicle 2 in the information processing device 4 including the management unit 42. An example of the operation related to the flight management of the unmanned aerial vehicle 2 in the information processing device 4 including the management unit 42 will be briefly described with reference to FIG. 4.

For example, the acquisition unit 41 acquires the remote ID from each of the RID receivers 3 (step 101). The acquisition unit 41 stores the acquired remote ID in the storage device 50 in a state where the receiver identification information assigned to the transmitted RID receiver 3 is associated with the acquired remote ID.

On the other hand, the management unit 42 executes the flight management process of the unmanned aerial vehicle 2 to be managed according to a predetermined processing procedure using the remote ID acquired by the acquisition unit 41 (step 102). The flight management of the unmanned aerial vehicle 2 by the management unit 42 is not limited to using all the remote IDs acquired from the RID receiver 3, and may be flight management using a remote ID selected by a predetermined selection method.

In a case where an instruction to the unmanned aerial vehicle 2 or a notification to the control system (GCS) of the unmanned aerial vehicle 2 is output by the flight management processing by the management unit 42, the output unit 43 outputs the instruction or the notification to the unmanned aerial vehicle 2 or the control system by a communication method related to the instruction or the notification (step 103).

The operation of steps 101 to 103 described above is repeatedly executed, for example, until a processing end command is input from the administrator to the information processing device 4.

As described above, the information processing device 4 can execute processing related to flight management of the unmanned aerial vehicle 2 using the remote ID. In the first example embodiment, the RID receiver 3 is not only fixed to a building or the like but also mounted on a mobile object in order to suppress a situation where the remote ID cannot be received due to deterioration of a communication status or the like. Therefore, in the unmanned aerial vehicle information acquisition system 1 according to the first example embodiment, the acquisition rate of the remote ID transmitted from the unmanned aerial vehicle 2 to be managed is improved, and the trouble of the flight management due to the failure in receiving the remote ID can be suppressed.

Figure 5:
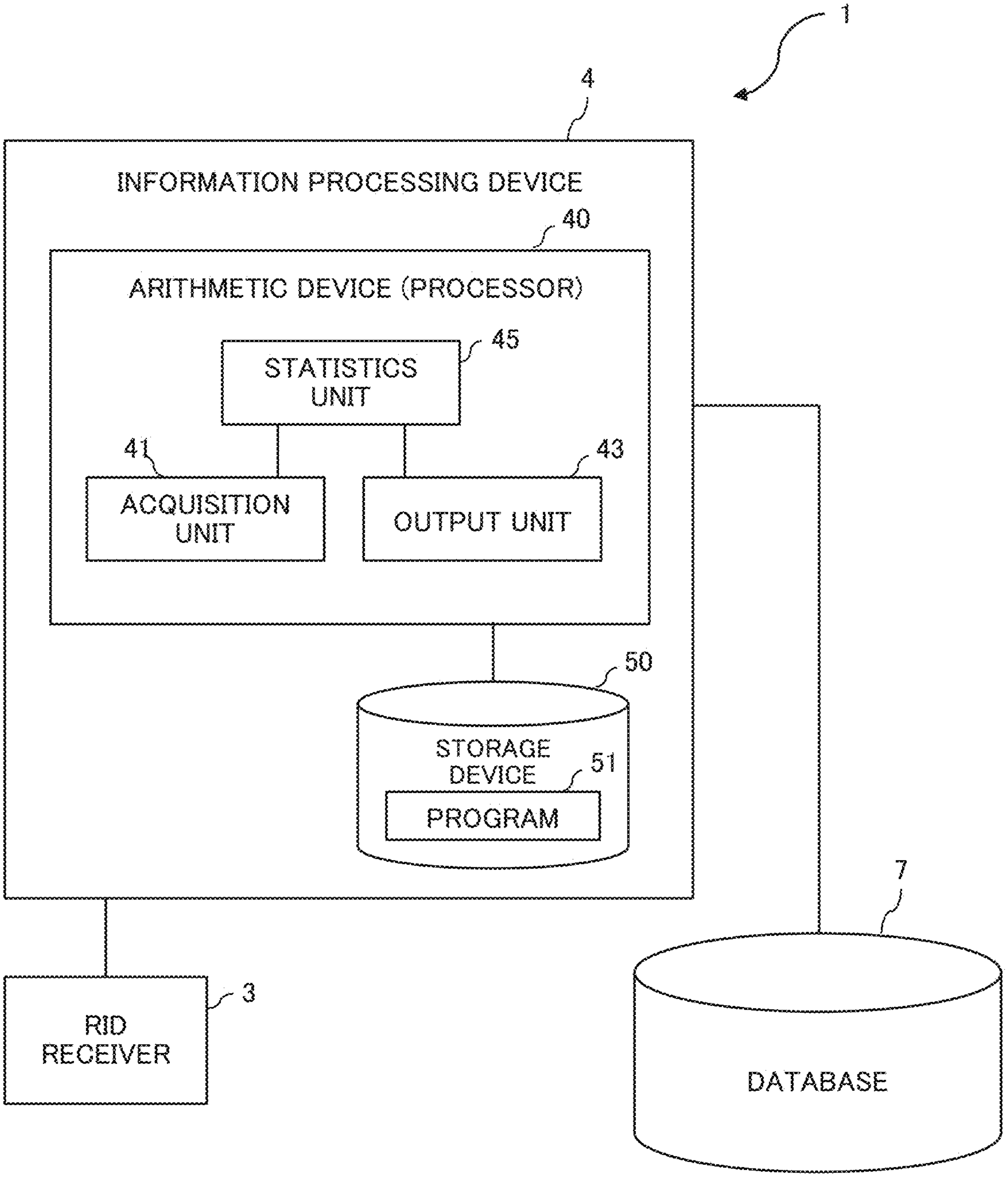
FIG. 5 is a diagram illustrating a configuration example of an information processing device including a statistics unit.

Next, an example of another process of the information processing device 4 using the remote ID will be described. FIG. 5 is a diagram for describing a configuration of the information processing device 4 in a case where the statistical process is performed on remote IDs. In the example of FIG. 5, the arithmetic device 40 of the information processing device 4 includes the acquisition unit 41, the output unit 43, and a statistics unit 45. As in the above, the acquisition unit 41 acquires the remote ID from each of the RID receivers 3, and stores the acquired remote ID in the storage device 50 in a state where the receiver identification information for identifying the RID receiver 3 transmitting the remote ID is associated with the remote ID.

The statistics unit 45 statistically processes the acquired remote ID. Although the statistical process executed by the statistics unit 45 is not limited, for example, an example thereof will be described below. For example, by statistically processing the position information and the time information for each airframe specific information of the remote ID, the statistics unit 45 calculates information about the appearance tendency (for example, an appearance tendency that "the unmanned aerial vehicle often flies in the  district around daytime every Tuesday") for each unmanned aerial vehicle 2. Since a very large number of remote IDs can be acquired by the acquisition unit 41 via the RID receiver 3, the statistics unit 45 may analyze the remote IDs by clustering that is one of artificial intelligence (AI) technologies. The result calculated by the statistics unit 45 by executing the statistical process (including the AI technology) in this manner is stored in, for example, the database 7**.

The output unit 43 outputs (replies) the analysis result of the remote ID calculated by the statistical process by the statistics unit 45 to the request destination (output destination) that has issued the output request in a preset output mode, for example, when receiving the output request.

As described above, the information acquisition system 1 for the unmanned aerial vehicle 2 according to the first example embodiment can increase the acquisition rate of the remote ID transmitted from the unmanned aerial vehicle 2 by equipping the mobile objects with some of the RID receivers 3. As a result, the information processing device 4 included in the information acquisition system 1 of the unmanned aerial vehicle 2 can smoothly execute processing using the remote ID.

In the above-described example, the information processing device 4 including the management unit 42 and the information processing device 4 including the statistics unit 45 are illustrated in separate drawings. However, the information processing device 4 may include both the management unit 42 and the statistics unit 45.

Second Example Embodiment

Hereinafter, the second example embodiment according to the present invention will be described. In the description of the second example embodiment, the same reference numerals are given to the same name parts as the names used in the description of the first example embodiment, and redundant description of the common parts will be omitted.

Figure 6:
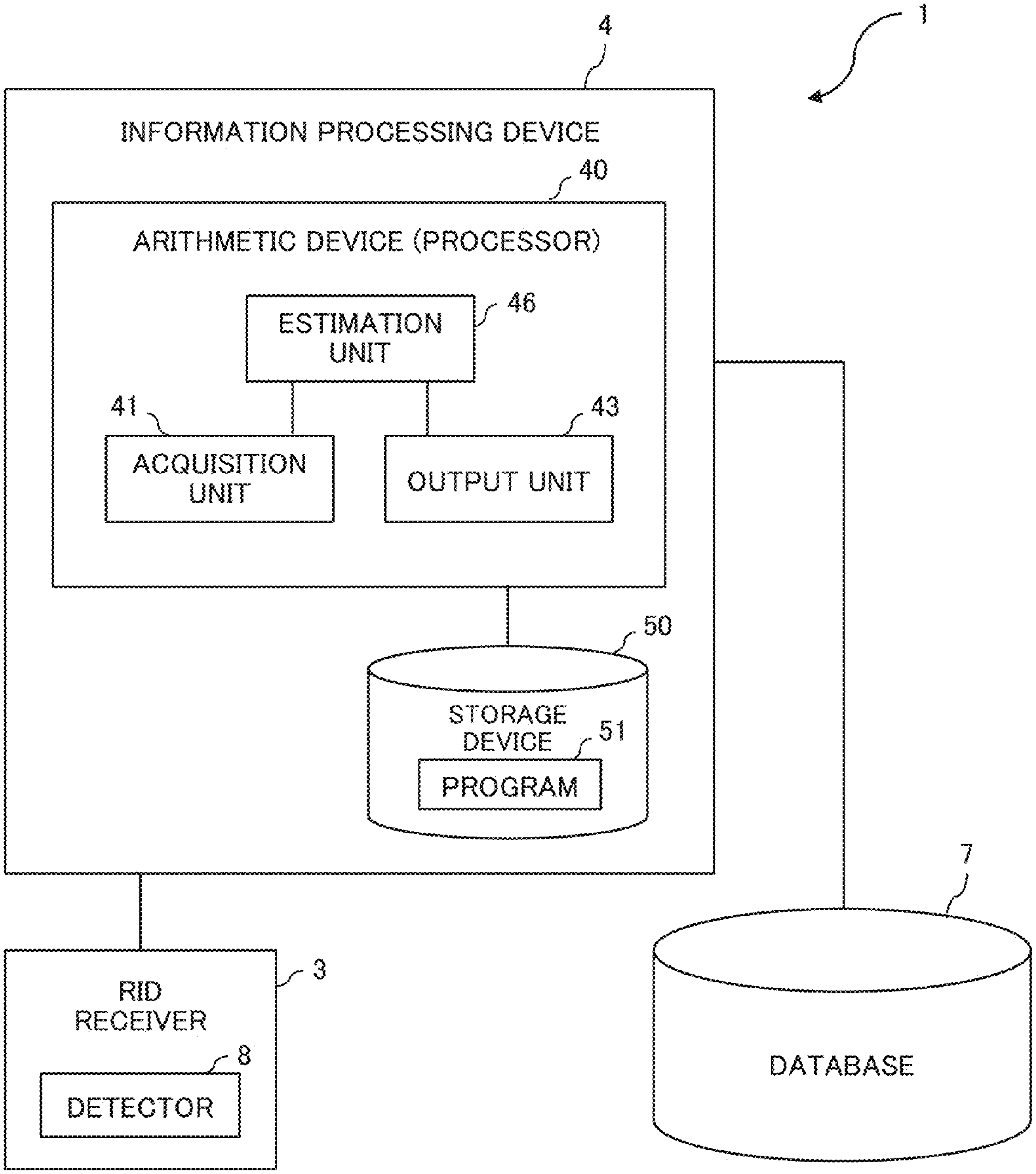
FIG. 6 is a diagram illustrating a configuration example of an information processing device including an estimation unit.

In the second example embodiment, a detector 8 as illustrated in FIG. 6 is mounted on each of the plurality of RID receivers 3 connected to the information processing device 4. The detector 8 is a detector that acquires a situation around the RID receiver 3. Specific examples of the detector 8 include a temperature sensor, a humidity sensor, a wind speed sensor, and an atmospheric pressure sensor for collecting weather information. Another example of the detector 8 includes a sensor that detects a radio wave condition for communicating a remote ID. Such one or more types of detectors 8 are mounted on the RID receiver 3. Such a detector 8 is not necessarily mounted on all the RID receivers 3. That is, some of the RID receivers 3 may not be provided with the detector 8.

The RID receiver 3 has a function of transmitting sensor output information indicating the sensor output which is output from the detector 8 to the information processing device 4. The sensor output information to be transmitted includes, for example, type information indicating the type of the related detector 8 and receiver identification information indicating the RID receiver 3 on which the detector 8 is mounted. In the case of the RID receiver 3 mounted on the mobile object, the sensor output information includes position information. This position information is information indicating the position of the mobile object when the sensor output included in the sensor output information is detected. The position information is obtained from, for example, a position information acquisition device (for example, a device using a global navigation satellite system (GNSS)) mounted on the mobile object.

As illustrated in FIG. 6, the arithmetic device 40 of the information processing device 4 includes the acquisition unit 41, the output unit 43, and an estimation unit 46. In the second example embodiment, the acquisition unit 41 not only acquires the remote ID but also acquires sensor output information based on the detector 8 from the RID receiver 3. The sensor output information acquired by the acquisition unit 41 is held in the storage device 50 or the database 7. The timing at which the acquisition unit 41 acquires the sensor output information based on the detector 8 may be the same as or different from the timing at which the remote ID is acquired, and is appropriately set.

The estimation unit 46 executes a process of estimating a situation (in other words, the conditions of the airspace in which the unmanned aerial vehicle 2 flies (weather conditions and radio wave conditions)) of the surrounding environment of the detector 8 (that is, the RID receiver 3) using the sensor output output from the detector 8. This process is a process according to the type of sensor, the output format (data format), and the like, and the processing method is not limited, and the description thereof will be omitted. The information indicating the situation of the surrounding environment of the RID receiver 3 estimated by the estimation unit 46 is stored in, for example, the database 7 in association with the information indicating the place and the information indicating the time as the flight airspace situation information. The flight airspace situation information may be information indicating a condition (weather condition or radio wave condition) for each preset area, instead of for each RID receiver 3 (detector 8).

The output unit 43 outputs the flight airspace situation information by the estimation unit 46 to the control system (GCS) of the unmanned aerial vehicle 2, for example, at preset time intervals or when receiving an output request of the flight airspace situation information from the control system (GCS) of the unmanned aerial vehicle 2. In the control system that has received the flight airspace situation information, the flight control of the unmanned aerial vehicle 2, the change of the flight plan, and the like are performed using the received information, that is, the weather condition and the radio wave condition of the airspace where the unmanned aerial vehicle 2 flies.

The configuration other than the above in the unmanned aerial vehicle information acquisition system 1 of the second example embodiment is similar to the configuration of the unmanned aerial vehicle information acquisition system 1 of the first example embodiment. That is, the management unit 42 and the statistics unit 45 described in the first example embodiment may also be provided in the arithmetic device 40 of the information processing device 4 in the second example embodiment.

In the second example embodiment, the RID receiver 3 equipped with the detector 8 is included, and the information processing device 4 has a function of estimating the situation of the airspace where the unmanned aerial vehicle 2 flies using the sensor output by the detector 8. Also in the second example embodiment, as in the first example embodiment, a large number of RID receivers 3 are disposed, and some of the RID receivers 3 are mounted on the mobile objects. Thus, the information processing device 4 can calculate flight airspace situation information based on many detectors 8. As a result, the information acquisition system 1 for an unmanned aerial vehicle according to the second example embodiment can improve reliability of flight airspace situation information.

OTHER EXAMPLE EMBODIMENTS

The present invention is not limited to the first and second example embodiments, and various example embodiments can be used. For example, in the first and second example embodiments, an example is illustrated in which the management unit 42 acquires the flight position of the unmanned aerial vehicle 2 in flight using the position information included in the remote ID. Regarding the acquisition of the flight position of the unmanned aerial vehicle 2 in flight, the following processing may be executed by the information processing device 4. That is, the position accuracy of the position information included in the remote ID may vary. In consideration of this, for example, in a case where not only the position information included in the remote ID but also the remote ID is received by the RID receiver 3 whose position is fixed, the information processing device 4 may acquire the flight position of the flying unmanned aerial vehicle 2 that has transmitted the remote ID using the information of the installation position of the RID receiver 3.

Figure 7:
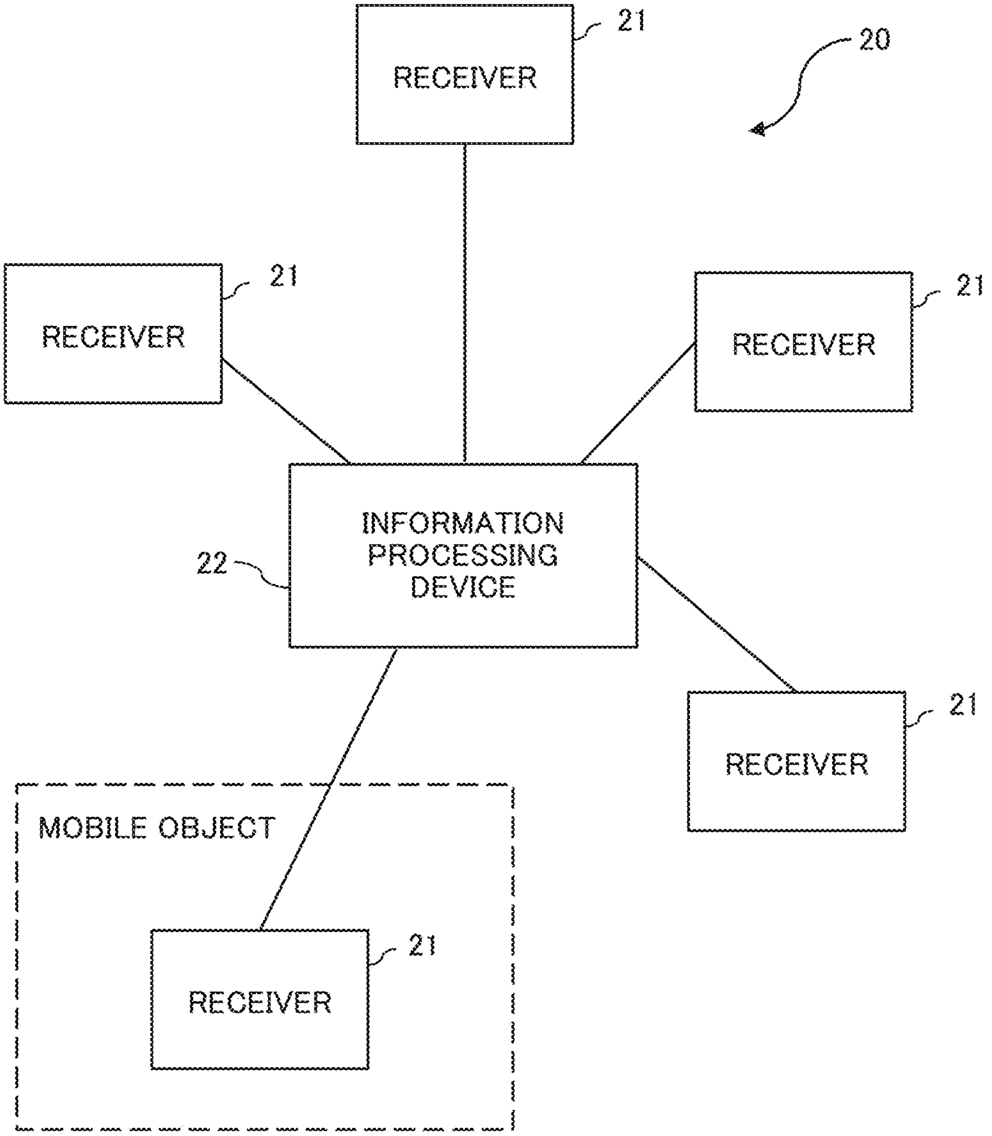
FIG. 7 is a diagram illustrating a configuration of an unmanned aerial vehicle information acquisition system according to another example embodiment of the present invention.

FIG. 7 is a diagram illustrating another example embodiment of the unmanned aerial vehicle information acquisition system according to the present invention. The unmanned aerial vehicle information acquisition system 20 includes a plurality of receivers 21 and an information processing device 22. The receiver 21 is a receiver that receives identification information transmitted from the unmanned aerial vehicle. The identification information is information that includes airframe specific information assigned to the unmanned aerial vehicle, position information representing the position of the unmanned aerial vehicle, and time information. The information processing device 22 is connected to the receivers, acquires the identification information received by the receivers, and information-processes the identification information.

The plurality of receivers 21 is provided in different places, and at least one of the receivers is provided in a mobile object.

REFERENCE SIGNS LIST

1, 20 information acquisition system of unmanned aerial vehicle
2 unmanned aerial vehicle
3 RID receiver
4, 22 information processing device
21 receiver

What is claimed is:

1. An unmanned aerial vehicle information acquisition system comprising:
- a plurality of receivers that receive identification information from an unmanned aerial vehicle by wireless communication, the identification information including airframe specific information assigned to the unmanned aerial vehicle, position information indicating a position of the unmanned aerial vehicle, and time information, and that are disposed at different places; and
- an information processing device that is connected to the plurality of receivers, that acquires the identification information received by the plurality of receivers, and that processes the identification information, wherein
- at least one of the plurality of receivers connected to the information processing device is mounted on a mobile object;
- the information processing device includes:
  - a memory configured to store instructions; and
  - at least one processor configured to execute the instructions to:
    - access a flight plan including a planned flight route in a storage device; and
    - control flight management of an unmanned aerial vehicle using the position information included in the acquired identification information, including comparing the position information included in the acquired identification information with the planned flight route included in the flight plan to determine whether the unmanned aerial vehicle is flying outside an allowable range from the planned flight route of the unmanned aerial vehicle, the unmanned aerial vehicle to be managed being the unmanned aerial vehicle the identification information of which is received by the plurality of receivers; and
- the flight management includes a handling process in a case where the unmanned aerial vehicle is flying outside the allowable range from the planned flight route of the unmanned aerial vehicle, the handling process including controlling the unmanned aerial vehicle to correct the flight route.

2. The unmanned aerial vehicle information acquisition system according to claim 1, wherein
- the information processing device includes:
  - a memory configured to store instructions; and
  - at least one processor configured to execute the instructions to:
    - control flight management of an unmanned aerial vehicle using the position information included in the acquired identification information, the unmanned aerial vehicle to be managed being the unmanned aerial vehicle whose the identification information is received by the plurality of receivers.

3. The unmanned aerial vehicle information acquisition system according to claim 1, wherein
- the information processing device includes:
  - a memory configured to store instructions; and
  - at least one processor configured to execute the instructions to statistically process the acquired identification information.

4. The unmanned aerial vehicle information acquisition system according to claim 1, wherein
- at least one of the plurality of receivers connected to the information processing device includes a detector that detects a surrounding situation, and
- the information processing device includes:
  - a memory configured to store instructions; and
  - at least one processor configured to execute the instructions to:
    - acquire information indicating the surrounding situation detected by the detector from the at least one of the plurality of receivers including the detector; and
    - estimate a situation of an airspace in which the unmanned aerial vehicle is flying using the acquired information.

5. The unmanned aerial vehicle information acquisition system according to claim 1, wherein
- the information processing device includes:
  - a memory configured to store instructions; and
  - at least one processor configured to execute the instructions to:
    - acquire the identification information from a fixed receiver whose position is fixed, the receiver being included in the plurality of receivers which receive the identification information from the unmanned aerial vehicle; and
    - detect a flight position of the unmanned aerial vehicle related to the airframe specific information included in the identification information acquired from the fixed receiver using not only the position information included in the identification information but also information about a position of a fixed place of the fixed receiver that received the identification information.

6. The unmanned aerial vehicle information acquisition system according to claim 1, wherein that the flight management includes at least an emergency helicopter handling process in a case of receiving a notification that an emergency helicopter is dispatched or an error handling process in a case of detecting an error of the unmanned aerial vehicle.

7. An unmanned aerial vehicle information acquisition method comprising:
- by an information processing device,
  - connecting each of a plurality of receivers to the information processing device, the plurality of receivers being disposed at different places and receiving identification information from an unmanned aerial vehicle by wireless communication, the identification information including airframe specific information assigned to the unmanned aerial vehicle, position information indicating a position of the unmanned aerial vehicle, and time information at least one of the plurality of receivers connected to the information processing device being mounted on a mobile object;

acquiring the identification information received by the plurality of receivers;

processing the identification information;

access a flight plan including a planned flight route in a storage device; and controlling flight management of an unmanned aerial vehicle to be managed using the position information included in the acquired identification information, including comparing the position information included in the acquired identification information with the planned flight route included in the flight plan to determine whether the unmanned aerial vehicle is flying outside an allowable range from the planned flight route of the unmanned aerial vehicle, the unmanned aerial vehicle to be managed being the unmanned aerial vehicle the identification information of which is received by the plurality of receivers, wherein the flight management includes a handling process in a case where the unmanned aerial vehicle is flying outside the allowable range from the planned flight route of the unmanned aerial vehicle, the handling process including controlling the unmanned aerial vehicle to correct the flight route.

8. The unmanned aerial vehicle information acquisition method according to claim 7, further comprising:

by the information processing device, controlling flight management of an unmanned aerial vehicle to be managed using the position information included in the acquired identification information, the unmanned aerial vehicle to be managed being the unmanned aerial vehicle whose the identification information is received by the plurality of receivers.

9. The unmanned aerial vehicle information acquisition method according to claim 7, wherein the information processing device statistically processes the acquired identification.

10. The unmanned aerial vehicle information acquisition method according to claim 7, wherein at least one of the plurality of receivers connected to the information processing device includes a detector that detects a surrounding situation, and wherein the unmanned aerial vehicle information acquisition method further includes, by the information processing device, acquiring information indicating a surrounding situation detected by a detector from the at least one of the plurality of receivers including the detector; and estimating a situation of an airspace in which the unmanned aerial vehicle is flying using the acquired information.

11. The unmanned aerial vehicle information acquisition method according to claim 7, further comprising:

by the information processing device, acquiring the identification information from a fixed receiver whose position is fixed, the receiver being included in the plurality of receivers which receive the identification information from the unmanned aerial vehicle; and detecting a flight position of the unmanned aerial vehicle related to the airframe specific information included in the identification information acquired from the fixed receiver using not only the position information included in the identification information but also information about a position of a fixed place of the fixed receiver that received the identification information.

* * * * *